United States Patent [19]

Wolff

[11] Patent Number: 4,909,680
[45] Date of Patent: Mar. 20, 1990

[54] DEVICE FOR MILLING GROOVES OR RABBET JOINTS

[76] Inventor: Robert Wolff, Im Kiesacker 12, 5446 Engeln, Fed. Rep. of Germany

[21] Appl. No.: 209,315

[22] Filed: Jun. 21, 1988

[30] Foreign Application Priority Data

Jul. 10, 1987 [DE] Fed. Rep. of Germany ....... 3722818

[51] Int. Cl.⁴ .......................... B23C 1/20; B27C 5/10
[52] U.S. Cl. ...................................... 409/137; 83/875; 144/136 C; 409/180
[58] Field of Search ............... 409/178, 180, 218, 137, 409/134; 83/875; 144/134 D, 136 C, 136 D, 1 E, 1 F; 30/505

[56] References Cited

U.S. PATENT DOCUMENTS 3,716,917 2/1973 Ruben .......................... 144/136 C X

FOREIGN PATENT DOCUMENTS 2838233 6/1979 Fed. Rep. of Germany ... 144/134 D
8118483 6/1981 Fed. Rep. of Germany .

Primary Examiner—Z. R. Bilinsky
Attorney, Agent, or Firm—Antonelli, Terry & Wands

[57] ABSTRACT

A device for the milling of grooves consists of a stop angle and a slide, which latter is displaceable on guides provided on the stop angle, the slide carrying a drive motor for a milling disk, a slot-shaped passage opening in the end plate being associated with the milling disk. In order to reduce the initial investment costs, the device is designed as an accessory unit for a commercial angle grinder, the slide exhibiting two multisectional fastening angles between which the angle grinder can be clamped in place, and a coupling shaft being supported in the slide; a threaded output stub of the angle grinder can be threaded into the upper end of the coupling shaft, which has a threaded bore, and the milling disk can be threaded to the lower end of the coupling shaft.

14 Claims, 5 Drawing Sheets

DEVICE FOR MILLING GROOVES OR RABBET JOINTS

BACKGROUND AND SUMMARY OF THE INVENTION

The invention relates to a device for milling grooves or rabbet joints, with a stop angle comprising a base plate and an end plate and with a slide displaceable on guide elements provided on the stop angle in parallel to the base plate against the bias of reset springs in the direction toward the end plate, the slide being fashioned as a carrier for a drive motor exhibiting a miter gear unit and for a milling disk, a slot-shaped passage opening in the end plate being associated with this milling disk.

In such a milling device, known from German Utility Model 8,118,483, the slide is threadedly attached directly to the housing of the drive motor by means of screws passing through the slide; this presupposes a corresponding pattern of threaded perforations in the motor housing. For this reason, the aforementioned device must usually be purchased as a unit and is correspondingly expensive.

In contrast thereto, with do-it-yourselfers, manually guided angle grinders have been widely popularized, these grinders having, at the drive head, two lateral mutually opposed threaded bores for attaching handle thereto by threading. These angle grinders have thus far been usable almost solely for grinding or polishing work.

The invention is based on the object of rendering commercially available angle grinders useful for constructing a milling device of the type described herein; in this connection, the milling device is to be adaptable to the varying dimensions and structural designs of the different angle grinder models and, at the same time, manipulation during assembly and during execution of the milling operations is to be simple.

In order to attain this object, the provisions are made according to the invention that the milling device is designed as an accessory unit that can be exchanged against the threaded-on guide handles and the grinding tool of a manually guided angle grinder; that the slide exhibits two multisectional fastening angles, between which the angle grinder can be clamped in place by means of mounting screws engaging into threaded holes for the guide handles; and that a coupling shaft is supported in the slide, the threaded output stub of the angle grinder being threadable into the upper end of this coupling shaft, which has a threaded bore, and the milling disk being threadedly attachable to the lower end of this coupling shaft.

The invention creates an accessory unit, by means of which a commercial angle grinder can be retrofitted with a few manipulations into an apparatus for the milling of grooves, e.g., arcuate grooves of laminate dowels, or also for the milling of rabbet joints, so that the owners of commercially available angle grinders need merely purchase additionally a relatively inexpensive attachment. After removing the handles and the grinding tool, the angle grinder is threaded with its threaded output stub into the coupling shaft of the accessory unit, the position of the angle grinder being already prefixed. By means of the multisectional fastening angles, the angle grinder is firmly threaded to the slide of the accessory unit, the fastening angles being designed to be displaceable and pivotable in such a way that it is possible to effect adaptation to the respective level position, to the width spacing, and to the axial directions of the threaded handle bores arranged at the head of the angle grinder. In an equally simple way, the angle grinder can again be dismounted from the accessory unit if it is to be utilized again for performing grinding or polishing operations. With such retooling, the angle grinder can remain fixedly clamped to the coupling shaft of the accessory unit, without change, so that the retooling operations remain limited to a few manipulations.

In accordance with a particularly suitable further development of the invention, the provision can be made that the base plate has a back web on the side facing away from the end plate; that the slide is guided on guide rods supported in the back web and in the web plate; that the base plate exhibits a longitudinal recess extending up into the end plate for accommodating a coupling shaft; and that the stop angle, adjoining the longitudinal recess, is subdivided into two components that can be attached to each other, at least the component comprising the end plate being removable operationally for the guide rods by pulling. These measures achieve, on the one hand, an exact guidance for the slide not susceptible to dirt contamination and, on the other hand, greatly simplify an exchange of the milling disk since in this structure the stop angle, housing the milling disk in a protective chamber, can be disassembled in such a way that the mounting site for the milling disk is freely accessible. The slide carrying the coupling shaft remains, during changing of the milling disk, at the component of the stop angle encompassing the end plate so that also a changing of the milling disk can be executed with a few manipulations.

The subject of the invention will be described in greater detail below with reference to an embodiment illustrated in the drawings.

BRIEF DESCRIPTION OF THE DRAWINGS

FIG. 2 shows partial sectional views along the lines IIa—IIa, IIb—IIb and IIc—IIc in FIG. 1;

DETAILED DESCRIPTION OF THE DISCLOSED EMBODIMENT

Figure 1:
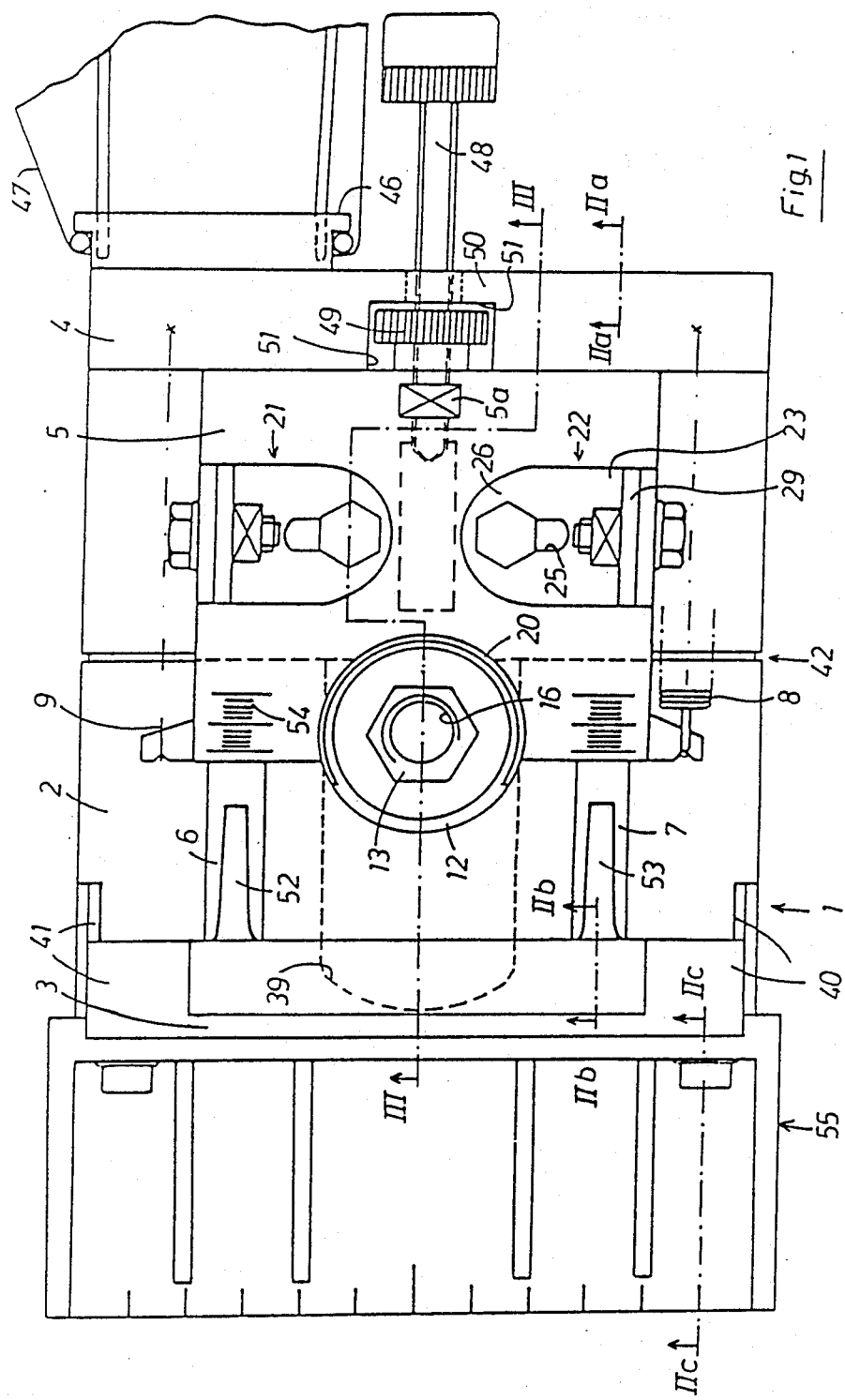
FIG. 1 shows a top view of the milling device according to the invention.

The milling device consists in its basic structure of a stop angle 1, comprising a base plate 2, a forward end plate 3, and a rear web 4, and of a plate-shaped slide 5 displaceable on two guide rods 6, 7 in parallel to the base plate 2 in the direction toward the end plate 3 against the force of two reset springs 8, 9. In the illustrated position, the slide 5 is in contact with the back web 4. The guide rods 6, 7 are supported in the end plate 3 and in the back web 4 and are there releasably clamped in place by means of hidden cap screws 10, 11 engaging into frontal threaded bores of the guide rods 6, 7 (compare FIG. 2). The forward end plate 3 is rigidified by rearward ribs 40, 41 and provided in the middle with a window 3a.

Figure 3:
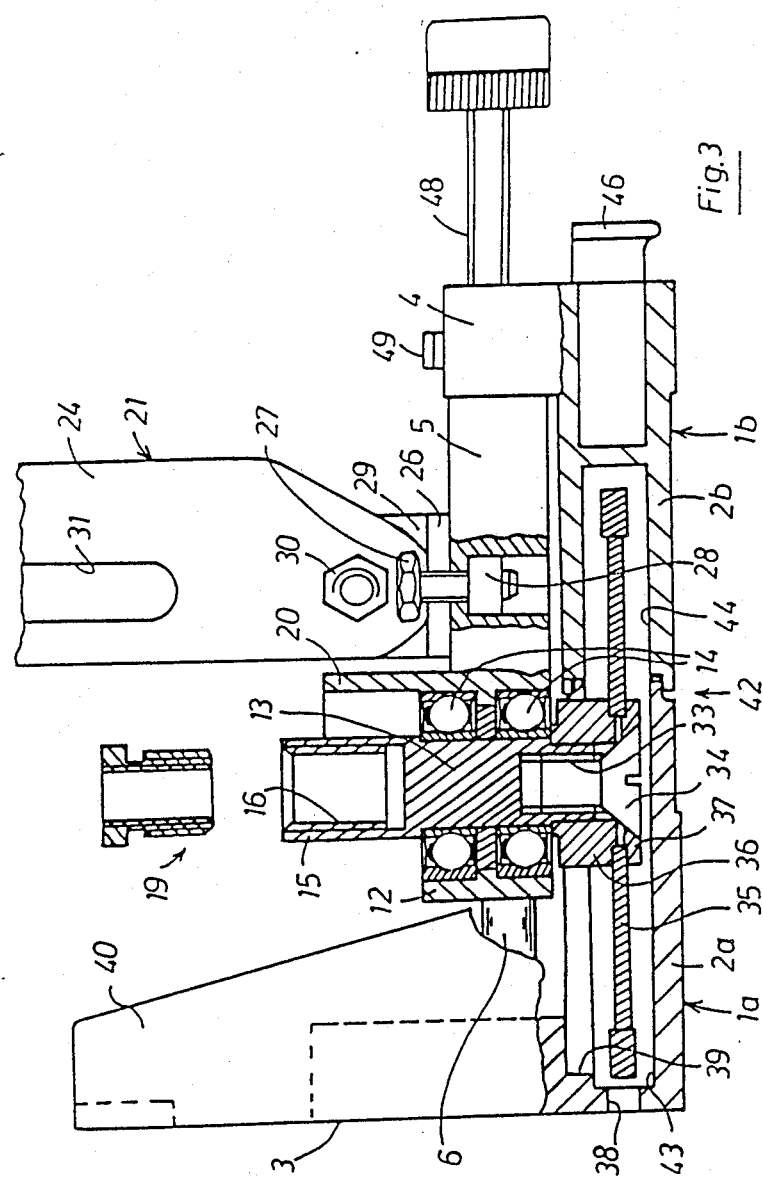
FIG. 3 shows a section along line III—III in FIG. 1.

A sleeve 12 oriented at a right angle with respect to the displacement plane is formed integrally at the forward end of the slide 5 (compare FIG. 3); a coupling shaft 13 is rotatably supported in this sleeve by way of two ball-bearing races 14. At an end section 15, located above the slide 5, the coupling shaft 13 is equipped with a threaded bore 16 into which can be threaded the threaded output stub 17 of a commercial angle grinder 18. The coupling shaft 13 is associated with a taper bushing 19 threadable into the threaded bore 16, this bushing permitting adaptation to angle grinder output stubs 17 having a correspondingly smaller diameter. The projecting end section 15 of the coupling shaft 13 exhibits a hexagonal outer profile for the attachment of a monkey wrench and is surrounded along the largest portion of its length and its periphery by a protective ring 20 consisting of an axial extension of the sleeve 12.

On its topside, the slide 5 furthermore carries two multisectional mounting angles 21, 22, each of which consists of a lower angle part 23 and a fishplate 24. The lower angle part 23 can be threaded in place with its leg 26 on the bottom side, exhibiting a slotted hole 25, by means of a screw 27 which latter engages into a nut 28 nonrotationally arranged at the slide 5; compare FIG. 3. The fishplate 24 is threadedly attached to the upper leg 29 by means of a screw 30. In the upper zone, the fishplate 24 has a slotted hole 31 serving for the accommodation of a fastening screw 32 which is threaded into threaded bores 33 at the head of the angle grinder 18. The slotted holes 25 of the angle parts 23 permit adaptation to the width of the head of the angle grinder 18, and the slotted holes 31 in the fishplates permit vertical adjustment. Also, the angle parts 23 can be pivotably adjusted about their mounting screws 27, and the fishplates 24 about their lower mounting screw 30, so that the milling device can also be threadedly attached to angle grinders having threaded handle bores 33 oriented obliquely with respect to the longitudinal axis of the angle grinder 18. The milling device is associated with several screws 32, 32a, 32b of varying diameters (compare FIG. 4), in order to take into account differing diameters in connection with the threaded handle bores 33.

A milling disk 35 is clamped in place between a mounting ring 36 and a clamping disk 37 to the lower end of the coupling shaft 13 by means of a screw 34" engaging into a lower threaded bore 33. The milling disk 35 is oriented toward a slot-like passage opening 38 in the end plate 3.

The base plate 2 is provided with a longitudinal recess 39 extending up into the end plate 3; this recess receives, upon an advance of the slide 5, the coupling shaft 13 and, respectively, the mounting ring 36.

The stop angle 1 is subdivided in the zone of its base plate 2, at a point 42 located at the rear end of the longitudinal recess 39, into two components 1a, 1b that can be attached to each other; the base plate halves 2a, 2b each exhibit a holding aperture 43, 44 for the milling disk 35. The rearward holding pocket 44 passes over into a chip ejection duct 45 terminating into a rearward clamping flange 46; to the latter, a chip collection bag 47 can be attached.

If the milling disk 35 is to be exchanged, the screws 10 are released from the guide rods 6, 7 and the component 1a encompassing the end plate 3 is pulled off the guide rods 6, 7 so that the clamping site for the milling disk 35 becomes freely accessible. The slide 5, the angle grinder 18, and optionally the chip bag 47 remain at the other component 1b in this operation.

The back web 4 is loosely traversed by a knurled-head screw 48 that can be threaded to a greater or lesser extent into a threaded member 5a on the slide side and thus limits the maximum advance of the slide 5, serving as a stop. Furthermore, a knurled nut 49 is guided on the shank of the knurled-head screw 48; this nut is located between the rear side of the slide 5 and the bottom 50 of a recess 51 arranged at the back web 4 and permits fine feeding of the slide 5. Two peg-shaped pointers 52, 53 extend from the end plate 3 rearwardly and are associated on the topside of the slide 5 with graduations 54 for indicating the respective advance of the slide.

Figure 2:
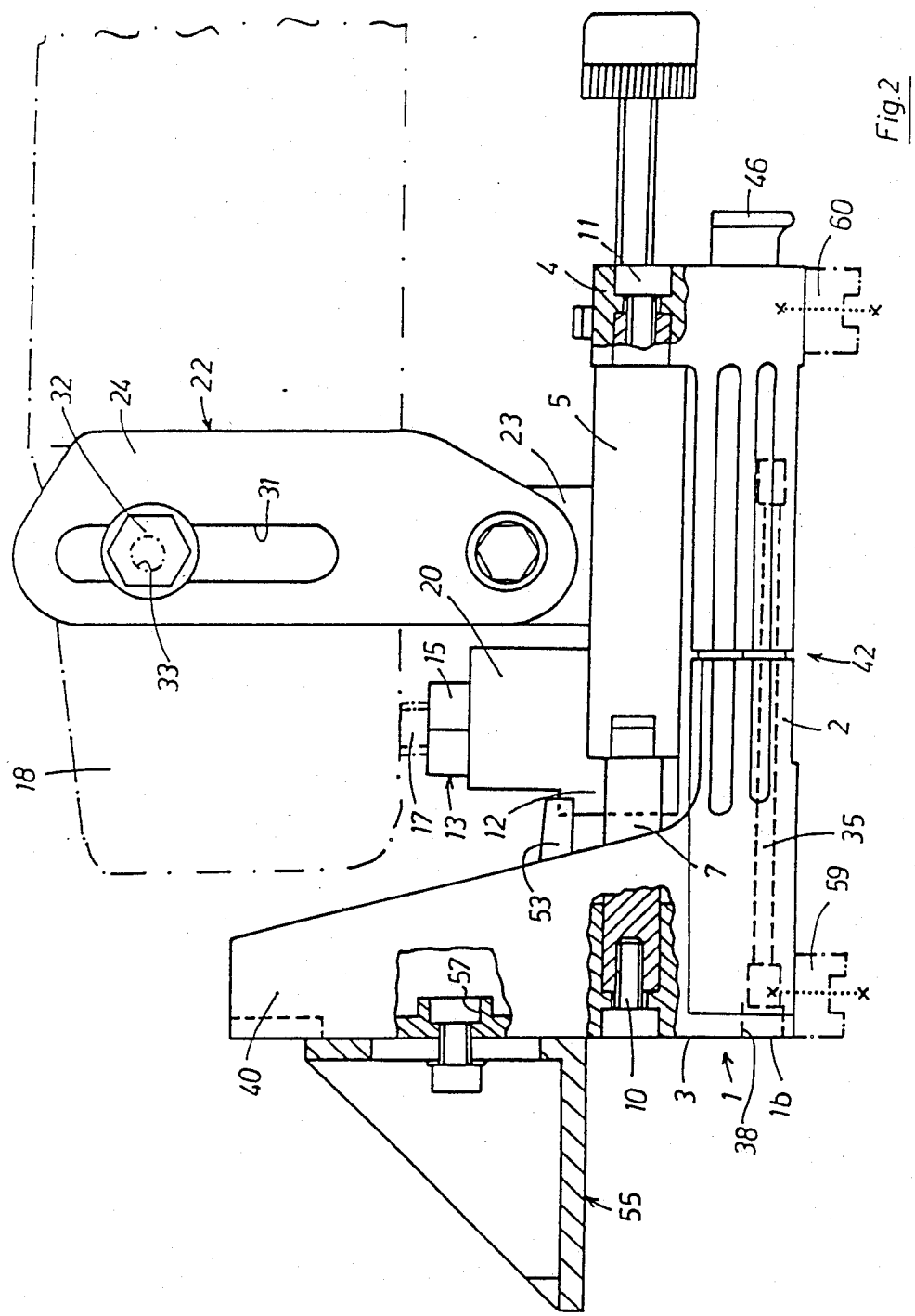
FIG. 2 shows a lateral view of the milling device according to FIG. 1, there being additionally indicated a threaded-on angle grinder; furthermore.
Figure 4:
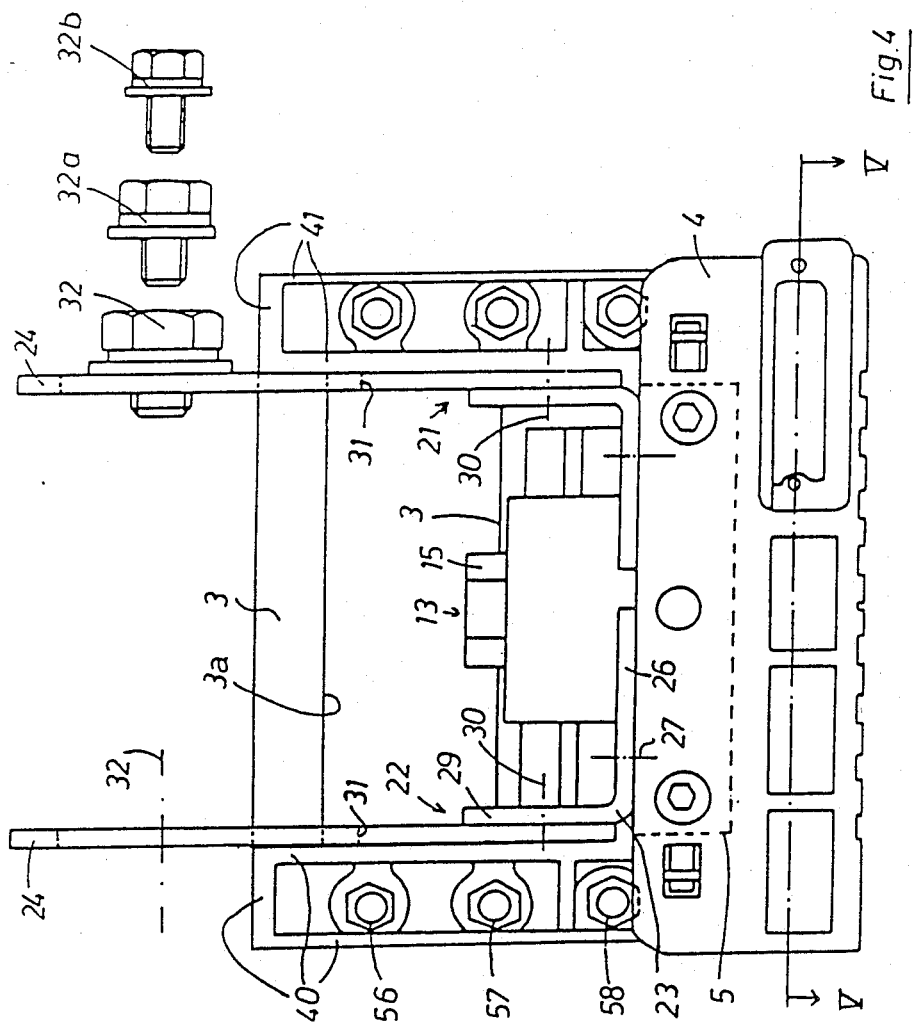
FIG. 4 shows a rear view of the milling device according to FIG. 1.
Figure 5:
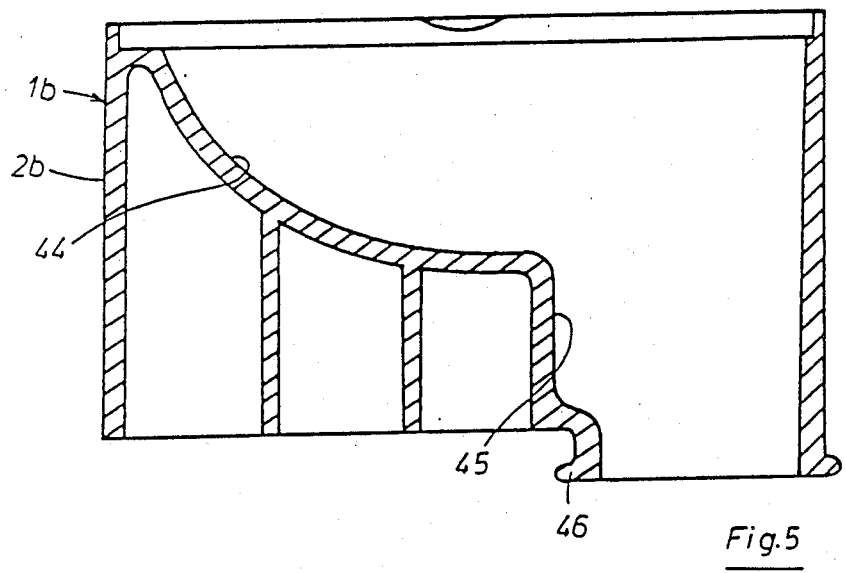
FIG. 5 shows a partial sectional view along line V—V in FIG. 4.

FIGS. 1 and 2 furthermore show additionally a work rest angle 55 which can be threaded to the end plate 3 in various positions with respect to height. As shown in FIG. 4, respectively three mounting holes 56, 57, 58 are provided on each slide of the end plate 3 for the threaded attachment of the work rest angle 55.

Furthermore, the milling device is also associated with two sled-shaped spacer members 59, 60, illustrated in FIG. 2; these spacer members can be threaded or clamped to the underside of the base plate 2 and extend over the full width of the base plate 2. These spacer members 59, 60 are utilized predominantly during the milling of rabbet joints.

I claim:

1. A device for the milling of grooves or rabbet joints, with a stop angle comprising a base plate and an end plate and with guide elements for a slide provided on the stop angle in parallel to the base plate, a slide displaceably mounted on the guide elements, and reset springs for biasing the slide against displacement in a direction toward the end plate, said slide including means for carrying a manually guided angle grinder as a drive motor and for carrying a milling disk adapted to be driven by said angel grinder, a slot shaped passage opening provided in the end plate for accommodating a milling disk carried by said slide, and wherein said means for carrying the angle grinder comprises two multisectional fastening angles, between which the angle grinder can be clamped in place by means of mounting screws engaging into threaded holes for guide handles of the angle grinder, and a coupling shaft supported in the slide, said coupling shaft having a threaded bore in an upper end thereof for threadedly receiving a threaded output stub of an angle grinder, and wherein said means for carrying a milling disk includes means for threadedly attaching a milling disk to the lower end of said coupling shaft.

2. A device according to claim 1, wherein said coupling shaft is supported in ball bearings on the slide side.

3. A device according to claim 1, wherein said slide comprises a plate guided on two guide elements in the form of rods, the end of said coupling shaft exhibiting the threaded bore for the angle grinder output stub projecting beyond the topside of said plate, said end of the coupling shaft being equipped with a polygonal outer profile for the attachment of a monkey wrench.

4. A device according to claim 3, wherein said projecting end of the coupling shaft is encompassed at least largely by a protective ring mounted to the slide.

5. A device according to claim 1, wherein the coupling shaft is associated with a taper bushing threadable into the upper threaded bore of the shaft, in order to adapt to the diameter of the output stub of the angle grinder.

6. A device according to claim 1, wherein the coupling shaft carries at its lower end a mounting ring for the milling disk, the milling disk being fixedly clampable between said mounting ring and a clamping disk by means of a countersunk screw engaging into a lower threaded bore of the coupling shaft.

7. A device according to claim 1, wherein the fastening angles each comprise a lower angle part that can be threadedly attached with its leg on the bottom side, exhibiting a slotted hole, to the slide with adaptation to the distance and axial direction of the handle threading holes, and of a fishplate which latter can be fixedly threaded at its lower end, under pivotal alignment, to the upper leg of the associated angle part and exhibits, in the upper zone, respectively one slotted hole for the mounting screws.

8. A device according to claim 1, wherein the base plate exhibits on the side facing away from the end plate a back web; the guide elements are supported in the back web and in the end plate; the base plate exhibits a longitudinal recess to accommodate the coupling shaft, said recess extending up into the end plate; and the stop angle is subdivided, adjoining the longitudinal recess, into two components that can be attached to each other, of which at least the component comprising the end plate can be operationally pulled off the guide elements.

9. A device according to claim 8, wherein the component comprising the end plate can be clamped in place at the other component by means of hidden cap screws engaging into threaded bores at the end faces of the guide rods.

10. A device according to claim 8, wherein the base plate halves each exhibit a holding aperture for the milling disk, the holding aperture of the rearward component passing over into a chip ejection duct which latter terminates into a rearward clamping flange to which a chip collection bag can be attached.

11. A device according to claim 8, further comprising a knurled-head screw as the stop limitation for the milling depth, this screw extending through the back web and being threaded into the slide.

12. A device according to claim 11, wherein a knurled nut, as the fine feed, is guided on the knurled-head screw and located between the back web and the slide.

13. A device according to claim 1, further comprising a work rest angle that can be threaded to the end plate in various positions with regard to height.

14. A device according to claim 1, further comprising sled-shaped spacer members for rabbet joint milling which are secured as by fastening or threading to the underside of the base plate.

* * * * *